United States Patent
Makavy et al.

(10) Patent No.: US 9,565,164 B2
(45) Date of Patent: Feb. 7, 2017

(54) TECHNIQUES TO RATE-ADJUST DATA USAGE WITH A VIRTUAL PRIVATE NETWORK

(71) Applicant: Facebook, Inc., Menlo Park, CA (US)

(72) Inventors: Ran Makavy, Sunnyvale, CA (US); Breno Roberto, Santa Clara, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/077,994

(22) Filed: Nov. 12, 2013

(65) Prior Publication Data
US 2015/0135303 A1    May 14, 2015

(51) Int. Cl.
| | |
|---|---|
| *H04L 29/06* | (2006.01) |
| *H04W 12/00* | (2009.01) |
| *H04W 88/02* | (2009.01) |
| *H04W 88/18* | (2009.01) |

(52) U.S. Cl.
CPC ....... *H04L 63/0272* (2013.01); *H04L 63/0227* (2013.01); *H04W 12/00* (2013.01); *H04W 88/02* (2013.01); *H04W 88/181* (2013.01)

(58) Field of Classification Search
None
See application file for complete search history.

(56) References Cited

U.S. PATENT DOCUMENTS

| | | |
|---|---|---|
| 7,036,143 B1 | 4/2006 | Leung et al. |
| 2006/0089121 A1 | 4/2006 | Elgebaly et al. |
| 2011/0125846 A1* | 5/2011 | Ham .................... H04L 12/1859 709/204 |
| 2011/0154477 A1* | 6/2011 | Parla ................... H04L 63/0272 726/15 |
| 2012/0002813 A1 | 1/2012 | Wei et al. |
| 2012/0023570 A1 | 1/2012 | Gorodyansky |
| 2012/0155380 A1* | 6/2012 | Hodges ................. G06Q 30/00 370/328 |

(Continued)

OTHER PUBLICATIONS

International Search Report and Written Opinion received for PCT Patent Application No. PCT/US2014/014008, mailed Aug. 12, 2014, 12 pages.

(Continued)

*Primary Examiner* — Jason K. Gee
*Assistant Examiner* — Thanh T Le
(74) *Attorney, Agent, or Firm* — Kacvinsky Daisak Bluni PLLC

(57) ABSTRACT

Techniques to rate-adjust data usage on mobile devices using a virtual private network are described. In one embodiment, an apparatus may include a processor circuit, and an application component operative on the processor circuit to present a link to third party data, receive a control directive to follow the link, and to request to access the third party data. The apparatus may also include a client virtual private network (VPN) component operative on the processor circuit to communicate with a server having a server VPN component, receive the request to access the third party data from the application component, determine whether the accessing is rate-adjusted, and connect to a source of the third party data via the server VPN component. Other embodiments are described and claimed.

16 Claims, 12 Drawing Sheets

(56) References Cited

U.S. PATENT DOCUMENTS

| | | | |
|---|---|---|---|
| 2012/0197995 A1* | 8/2012 | Caruso | G06F 17/3089 709/204 |
| 2012/0209990 A1* | 8/2012 | Honore | H04L 12/1496 709/224 |
| 2012/0239817 A1* | 9/2012 | Ensing | G06Q 50/01 709/228 |
| 2012/0250586 A1* | 10/2012 | Ahmavaara | H04L 41/0896 370/259 |
| 2012/0253918 A1* | 10/2012 | Marois | G06Q 30/02 705/14.39 |
| 2012/0260314 A1 | 10/2012 | Babula et al. | |
| 2013/0102276 A1* | 4/2013 | Raj | H04L 12/1475 455/406 |
| 2013/0108269 A1 | 5/2013 | Kim et al. | |
| 2013/0196621 A1* | 8/2013 | Guday | H04W 24/02 455/406 |
| 2013/0215740 A1 | 8/2013 | Tse et al. | |
| 2014/0207877 A1* | 7/2014 | Kandaswamy | H04L 51/24 709/206 |
| 2015/0025976 A1* | 1/2015 | Guo | G06Q 30/0267 705/14.64 |
| 2015/0156330 A1* | 6/2015 | Raj | H04L 12/1475 455/406 |

OTHER PUBLICATIONS

European Search Report received for European Patent Application No. 14170306.6, mailed Jul. 22, 2014, 9 pages.

\* cited by examiner

TECHNIQUES TO RATE-ADJUST DATA USAGE WITH A VIRTUAL PRIVATE NETWORK

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to rate-adjust data usage on mobile devices using a virtual private network. Some embodiments are particularly directed to techniques to rate-adjust data usage selectively from a client of a social networking service on a mobile device. In one embodiment, for example, an apparatus may include a processor circuit, and an application component operative on the processor circuit to present a link to third party data, receive a control directive to follow the link, and to request to access the third party data. The apparatus may also include a client virtual private network (VPN) component operative on the processor circuit to communicate with a server having a server VPN component, receive the request to access the third party data from the application component, determine whether the accessing is rate-adjusted, and connect to a source of the third party data via the server VPN component. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
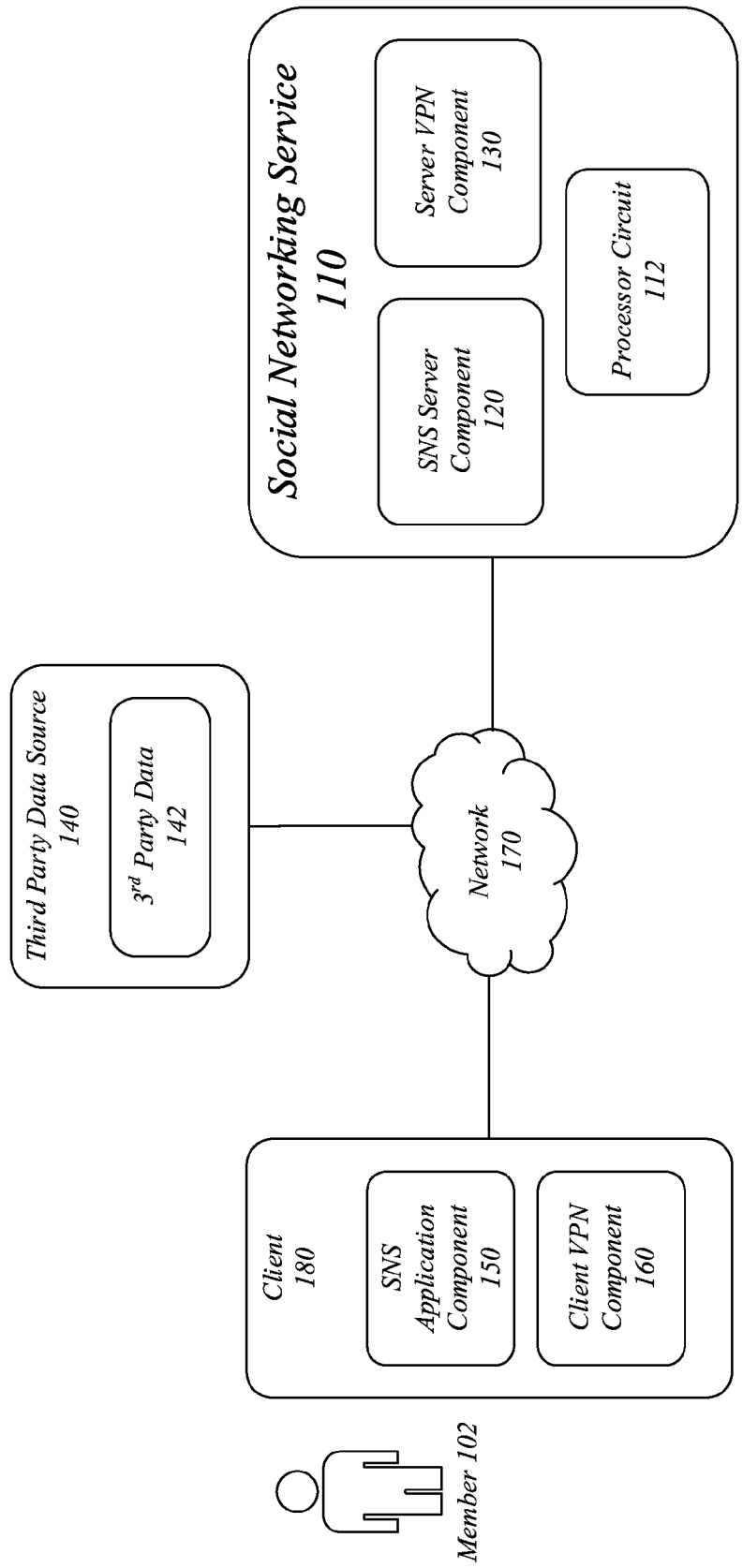
FIG. 1 illustrates an embodiment of an execution system to provide rate-adjusting of data usage from a mobile client device.

Various embodiments are directed to techniques to rate-adjust data usage selectively from a client of a social networking service on a mobile device. Social networking services (SNS) provide ways for members to form and maintain personal, professional, commercial and other relationships among the members. SNSs also provide ways for members to produce and/or share content with other members, including data from third party sources such as external web sites and other applications.

Increasingly, members of SNSs access the SNS from their mobile devices, e.g. smart phones and tablet computers. In addition to providing cellular telephone service, many cell phone carriers also provide data services that allow the subscribed mobile device to connect wirelessly to networks such as the Internet. Many subscription plans and pre-paid plans impose a limit on how much data a subscribed user can access in a plan period, typically one month. Accessing data may include downloading data to and/or uploading data from the mobile device. When a subscribed user's data usage exceeds the plan limit for a time period, the carrier may impose an overage fee or other penalties.

Carriers may choose to rate-adjust an instance of data usage. Rate-adjusting may include zero rating, where the instance of data usage is not counted at all toward the plan limit. Rate-adjusting may also include causing only some percentage of the instance of data usage to count toward the plan limit. For example, data used in communicating with the carrier may be rate-adjusted. In some cases, data-using applications that execute on a mobile device may be rate-adjusted by agreement between the carrier and the entity that produces the application.

Some SNSs may be accessed from a mobile device client application, and data used in communication with an SNS server may be rate-adjusted. Some SNSs allow members and applications to share content, typically with a link to the content. When the link to the content is followed, the mobile device may connect with a third party source outside of the SNS. The data usage for the connection to the third party source may not be covered by the rate-adjusting of the SNS and may be counted toward the user's plan limit, in some cases, unknowingly or unexpectedly.

An SNS may have an agreement with a third party data source, such as a particular application provider, web site, service provider and so forth, to rate-adjust data usage incurred for the third party data source from within the SNS. Conventionally, the determination of rate-adjusting may have occurred at the SNS server. However, identifying a rate-adjusted application from the server side may be problematic because, from the SNS server, the information about which application or service is using the data is usually lost. Accordingly, embodiments may implement a client-side virtual private network (VPN) that may receive all data usage traffic from the SNS client application. The client-side VPN may be generally in a better position to know what application or service is requesting the third party data, and can determine whether that application or service is rate-adjusted, and can route the accessing of the third party data accordingly. As a result, the embodiments can improve the user experience in the SNS for its members.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for an execution system 100. In one embodiment, the execution system 100 may be computer-implemented and have a social networking service 110 comprising one or more components. Although the execution system 100 shown in FIG. 1 has a limited number of elements in a certain topology, it may be appreciated that the execution system 100 may include more or fewer elements in alternate topologies as desired for a given implementation.

Execution system 100 may include social networking service (SNS) 110. SNS 110 may be arranged to provide social networking services for its members, e.g. member 102. Members may interact with SNS 110 via client devices, e.g. client 180, communicating with SNS 110 using network 170. The social networking services may include, without limitation, finding members, forming relationships with members, sharing content, providing applications, providing communication between and among members, and so forth. SNS 110 may include an SNS server component 120, and a server virtual private network (VPN) component 130. Some or all of the components of SNS 110 may provide their respective functions when executing on processor circuit 112.

SNS server component 120 may provide many of the SNS functions and data for SNS 110. For example, SNS server component 120 may comprise one or more network servers that provide interfaces through which Internet browser applications can connect and present the SNS to a member, and through which a client application on a device can connect and present the SNS 110 to a member. SNS server component 120 may maintain data about the members of SNS 120 such as member information, member connections to other members, privacy settings, sharing settings, and other data specific to a member. SNS server component 120 may further store content uploaded to SNS 110, such as photographs, videos, documents, and so forth. The embodiments are not limited to these examples.

Server virtual private network (VPN) component 130 may receive and send data on behalf of SNS server component 120 in connection with a client VPN component. Server VPN component 130 may connect a member 102 to a third party data source 140 in such a way as to rate-adjust the data used during that connection. Server VPN component 130 may receive a request for third party data from client 180, as will be described in further detail below. When the server VPN component 130 completes the connection from client 180 to third party data source 140, the connection may appear to the carrier as a data usage from SNS 110 and will therefore be rate-adjusted.

The illustrated components of SNS 110 may be housed together on one apparatus or may be distributed at least in part on a plurality of apparatuses. The plurality of apparatuses may be in one geographic location or separate in various geographic locations.

A third party data source 140 may comprise one or more network servers providing a source for data and/or services that are separate from both client 180 and from SNS 110. Examples of third party data sources 140 may include, without limitation, a web site, or a data repository or sever used by an application executing on client 180. Third party data source 140 could be, for example, a news web site, a game application data source, a video sharing repository, a map service, a search engine, and so forth. "Separate" may mean, in this context, that third party data source 140 stores third party data 142 in a different physical and logical location from SNS 110 and from client 180, and that third party data source 140 is not controlled by an entity that controls SNS 110. The embodiments are not limited to these examples. Third party data 142 may include data that is not owned and/or controlled by SNS 110. Third party data 142 may be stored externally to client 180 and to SNS 110.

A member 102 may use client 180 to access and use SNS 110. Client 180 may be any computing device capable of connecting to and communicating with SNS 110. In particular, client 180 may be a mobile device that is subscribed to a data plan with a carrier, where the data plan has imposed a limit on data usage, for example, a monthly quota or a pre-paid amount. The embodiments are not limited to these examples.

Client 180 may include an SNS application 150 and a client VPN component 160. SNS application 150 may be a standalone application that can execute on client 180 to communicate with, view, and interact with SNS 110. While SNS 110 may be accessible via a web browser application, SNS application 150 may provide an interface to SNS 110 that is more optimized to client 180, e.g. for a smaller display. SNS application 150 is described in further detail with respect to FIG. 2 below. Although client VPN component 160 is depicted as being separate from SNS application component 150 in FIG. 1, client VPN 160 may alternatively be a component of SNS application component 150.

Client VPN component 160 may be operative to connect to server VPN component 130 and form a VPN with SNS 110. A virtual private network (VPN) is a type of secure connection between two endpoints over an otherwise public network such as the Internet. A VPN acts as a dedicated secure tunnel for data between the endpoints. The tunnel may be created using dedicated connections, encryption of the data, or a combination of both.

Client VPN component 160 may receive some or all network traffic from SNS application 150, including requests to access a third party data source 140, and may determine whether data usage for a particular third party data source 140 should be rate-adjusted. Client VPN component 160 is described in further detail with respect to FIG. 2 below.

Figure 2:
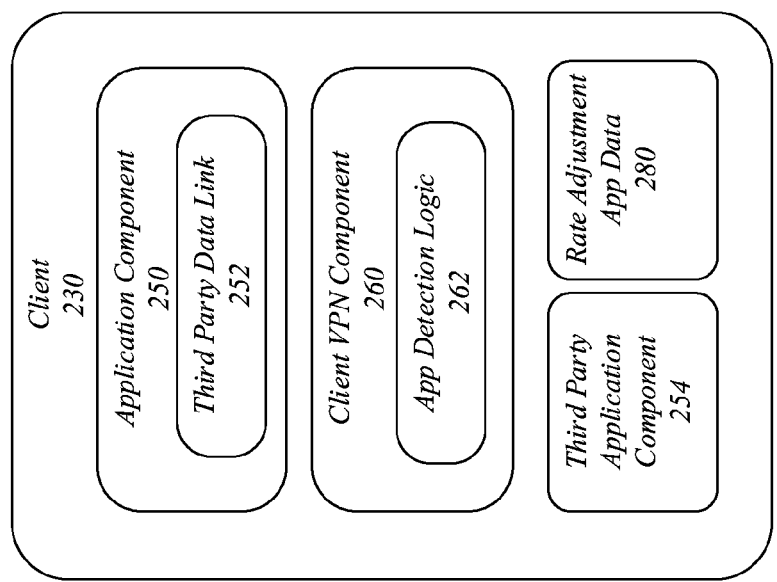
FIG. 2 illustrates an embodiment of a client environment.

FIG. 2 illustrates an embodiment of a client environment 200. Client environment 200 may include client 230, which may be an example of client 180 from FIG. 1. Client 230 may include an application component 250 and a client VPN component 260. Although the client environment 200 shown in FIG. 2 has a limited number of elements in a certain topology, it may be appreciated that the client environment 200 may include more or fewer elements in alternate topologies as desired for a given implementation.

Application component 250 may be an example of SNS application component 150. Application component 250 may include instructions stored on client 230 that, when executed on a processing circuit on client 230, present an interface through which the member 102 can access SNS 110. Application component 250 may, for example, present an interface that shows content shared by other members of SNS 110, information shared by applications and services, and so forth.

Some of the shared content may be in the form of a third party data link 252. A third party data link 252 may include, for example, a uniform resource locator (URL) that links to a network location different from a URL of SNS 110 or from a URL of server VPN component 130. A third party data link 252 may include a link that, when followed, causes a second application to execute on the mobile device; or a link that, when followed, executes a script on the mobile device. For example, third party data link 252 may be a link to a news story on a news website, or a link that launches a separate game application on client 230. The embodiments are not limited to these examples.

A third party application component 254 may execute within application component 250, or may execute outside of application component 250. Third party application component 254 may need to access third party data 142 from a third party data source 140 in order to operate. For example, third party application component 254 may need to access user information, account settings, graphics, interfaces, instructions and so forth, in order to function on client 230. If a member 102 causes third party application component 254 to execute from application component 250, third party application component 254 may need to connect to and request third party data 142 from third party data source 140, and may do so without the explicit use of a displayed third party data link 252.

Client VPN component 260 may receive a request to access third party data 142 via third party data link 252 (or implicitly via third party application component 254) from application component 250. Client VPN component 260 may determine whether accessing the third party data 142 should be rate-adjusted. When the accessing should be rate-adjusted, client VPN component 260 may use its VPN connection to server VPN component 130 to connect to the third party data source 140 via server VPN component 130.

In an embodiment, client VPN component 260 may need to detect what application is requesting or is otherwise associated with the requested third party data 142 for the purpose of rate-adjusting. App detection logic 262 may be used by client VPN component 260 to, for example, read an application identifier inserted into a request to access third party data 142, or use information in a URL to determine the application relevant to the rate-adjusting determination. The embodiments are not limited to these examples.

Client VPN component 260 may determine whether accessing a third party data source 140 should be rate-adjusted by referencing rate-adjustment app data 280. In an embodiment, rate-adjustment app data 280 may be a data set, e.g. a list, an array, a database, a table, a set of rules, and so forth, that includes information about what data usage should be rate-adjusted. Rate-adjustment app data 280 may specify applications, web sites, types of data, or any other criteria that determine what data usage is to be rate-adjusted for the member 102. Rate-adjustment app data 280 may include rules received from SNS 110 that may cause rate-adjusting when applied to criteria such as what third party data source 140 is referenced by the link, what application component 250, 254 requested to follow the link, an estimated amount of data traffic associated with the request, and so forth. In an embodiment, rate-adjustment app data 280 may be updated by SNS 110 periodically or whenever client 230 connects to SNS 110.

Client VPN component 260 may determine that accessing a third party data source 140 should not be rate-adjusted, for example, if the requesting application is not included in rate-adjustment app data 280. When the accessing is not to be rate-adjusted, client VPN component 260 may connect to the third party data source 140 via network 170 but without using a VPN connection to server VPN component 130.

In an embodiment, client VPN component 260 may display an alert, when the accessing is not rate-adjusted. The alert may include a message to the member 102 that informs the member 102 that connecting to third party data source 140 may not be rate-adjusted, may incur a data usage charge, or may count toward the member 102's data plan usage, for example. The alert may include a selectable option to continue with the accessing and a selectable option to cancel the accessing. When a command directive selecting the selectable option to continue is received, client VPN component 260 may proceed to connect to the third party data source 140.

In addition to, or alternatively to, determining whether to rate-adjust a data usage for application component 250 and/or third party application component 254, client VPN component 260 may determine and apply a level of compression for a data connection between the client VPN and third party data source 140. Client VPN 260 may determine and apply a traffic shaping measure for a data connection between the client VPN and third party data source 140. Client VPN 260 may determine and apply a filter for a data connection between the client VPN and third party data source 140. Client VPN 260 may determine and apply an anti-virus operation to a data connection between the client VPN and third party data source 140.

Figure 3:
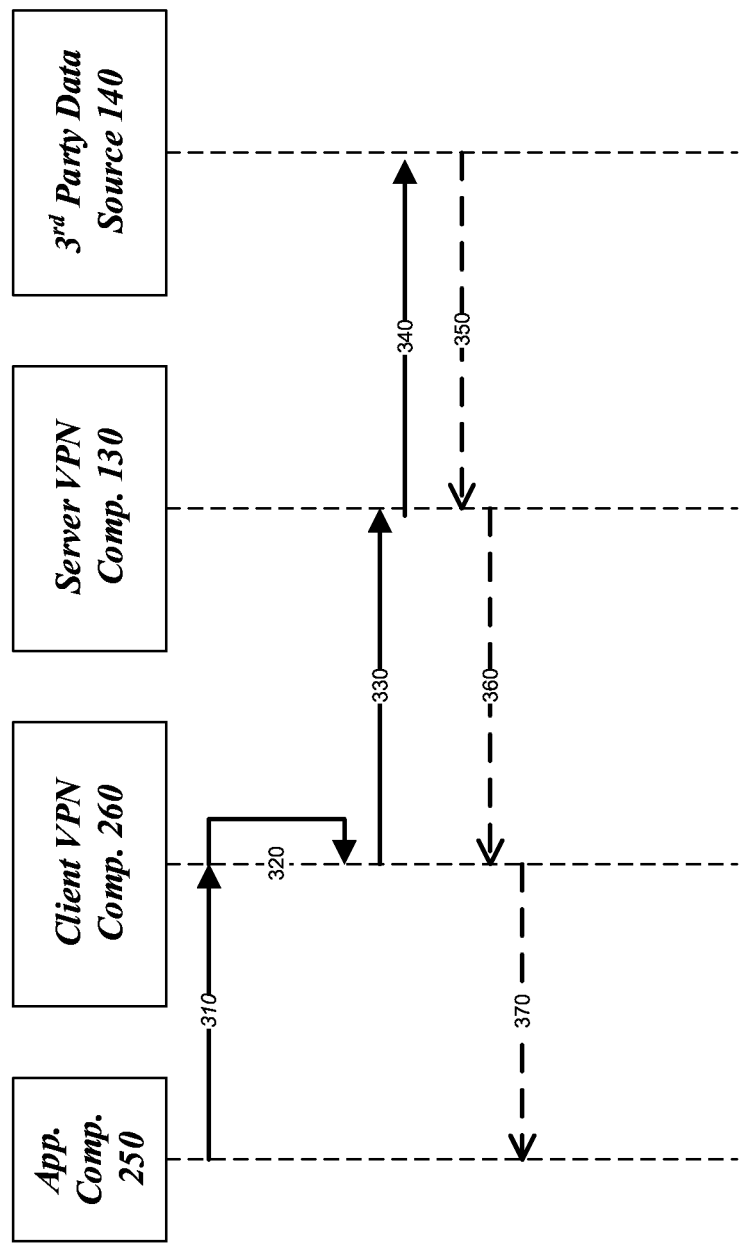
FIG. 3 illustrates an embodiment of a first message flow.
Figure 4:
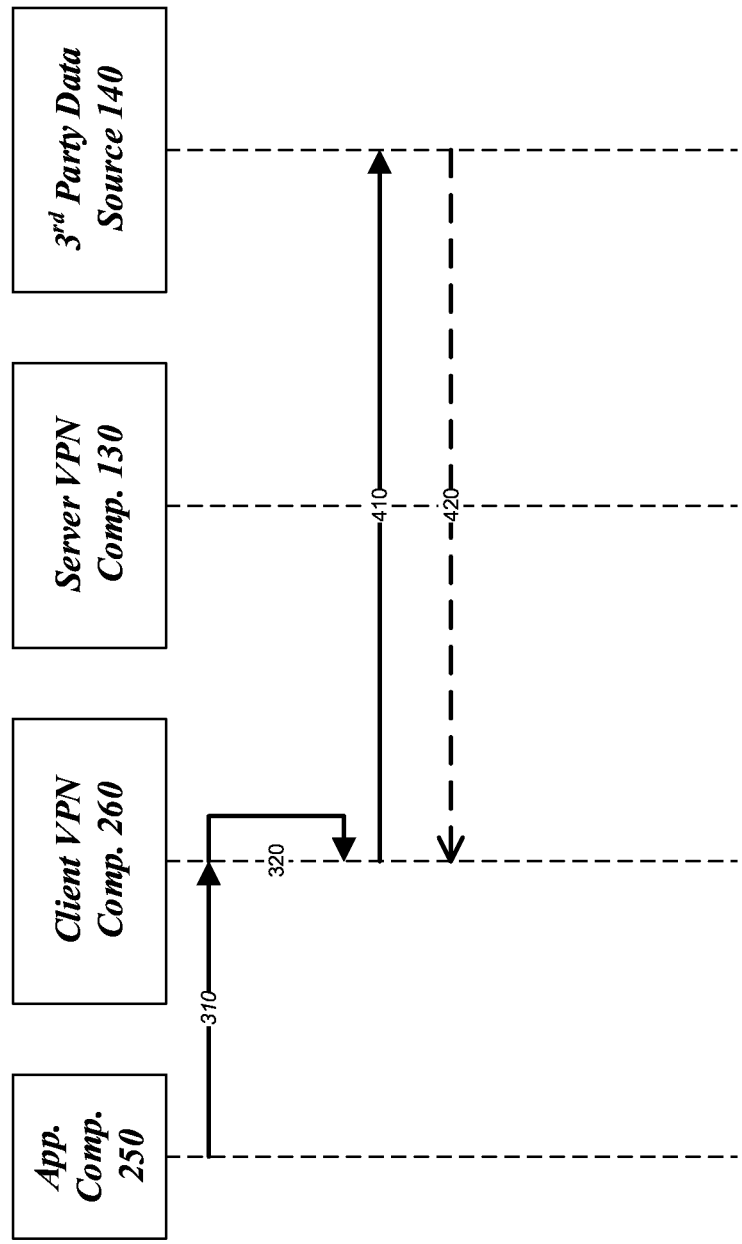
FIG. 4 illustrates an embodiment of a second message flow.
Figure 5:
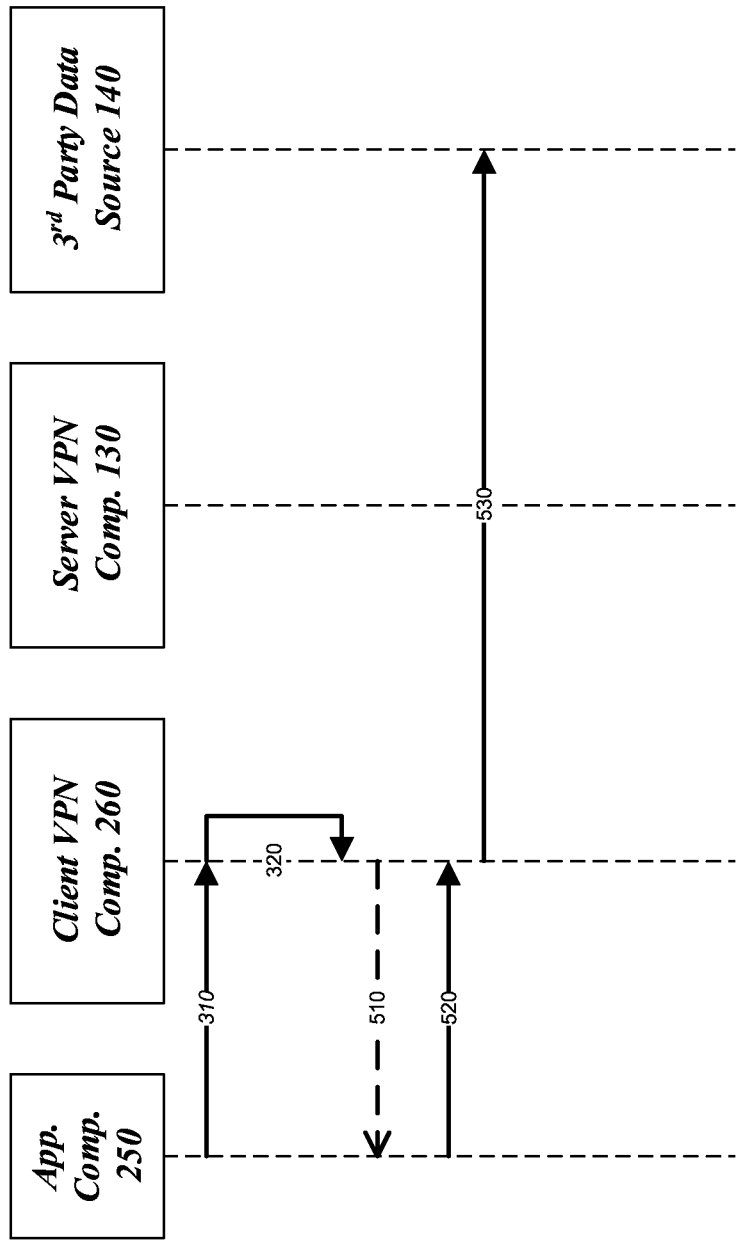
FIG. 5 illustrates an embodiment of a third message flow.

FIGS. 3-5 show message flows for system 100. FIG. 3 illustrates an embodiment of a message flow 300 for the system 100, illustrating the communication of several of the components of system 100 when a member using client 230 issues a control directive to client 230 to follow a third party data link 252 in application component 250. The components illustrated in FIG. 3 may be the same as, or analogous to, the components of system 100 as illustrated in FIGS. 1 and 2. Message flow 300 may begin after member 102 has launched application component 250 and connected to SNS 110, and after application component 250 is displaying at least one third party data link 252.

As shown in FIG. 3, application component 250 has already received a control directive to follow the third party data link 252. In response, application component 250 sends a request 310 to client VPN component 260 to access the third party data 142 referenced by the third party data link 252.

Client VPN component 260 may determine, in action 320, that accessing the third party data source 140 referenced by the third party data link 252 should be rate-adjusted. This determination may include looking up whether an application associated with the third party data link 252 is included in rate-adjustment app data 280.

Client VPN component 260 may then send the request 310 to server VPN component 130 in message 330. Message 330 may be sent through a VPN established between client VPN component 260 and server VPN component 130. Data usage associated with message 330 would be rate-adjusted by the carrier because it remains within the already rate-adjusted SNS 110 traffic.

Server VPN component 130 may then complete the access request by connecting, in message 340, application component 250 to third party data source 140 to access the requested third party data 142. Message 340 may appear to the carrier to originate with server VPN component 130, and is therefore rate-adjusted regardless of its destination or originating application.

In message 350, third party data source 140 provides the third party data 142 requested by application component 250. The returned requested data may be passed through the established VPN connection between server VPN component 130 (message 360) and client VPN component 260 before being received by application component 250 (message 370).

FIG. 4 illustrates an embodiment of a message flow 400 for the system 100. Message flow 400 begins similarly to message flow 300, however, in action 320, client VPN component 260 may determine that accessing the third party data source 140 referenced by the third party data link 252 should not be rate-adjusted.

When accessing a third party data source should not be rate-adjusted, client VPN component 260 may complete the access request by connecting, in message 410, application component 250 to third party data source 140 to access the requested third party data 142. Of note, message 410 does not pass through server VPN component 130, but instead more generally through a network, such as network 170. Message 410 may appear to the carrier as originating from the client device and the data usage involved will likely be counted toward the member's data plan.

In message 420, third party data source 140 provides the third party data 142 requested by application component 250. Message 420 may be received directly by application component 250, or (not shown) first by client VPN component 260 which would pass the data to application component 250.

FIG. 5 illustrates an embodiment of a message flow 500 for the system 100. Message flow 500 is very similar to message flow 400. However, in message flow 500. After determining that accessing the third party data source 140 referenced by the third party data link 252 should not be rate-adjusted (action 320), client VPN component 260 returns an alert 510 to application component 250. The alert may inform application component 250 that the requested data usage will not be rate-adjusted. The alert may be displayed to the member with a message, such as "Accessing this link may count toward your data usage" or "Accessing this link will not be rate-adjusted". The alert may also provide the member with the options to continue or cancel the accessing.

When the member opts to continue the accessing (not shown), application component 250 may inform client VPN component 260 with message 520 to continue with the accessing. Then client VPN component 260 may proceed, with message 530 as with message 410 from message flow 400.

Figure 6:
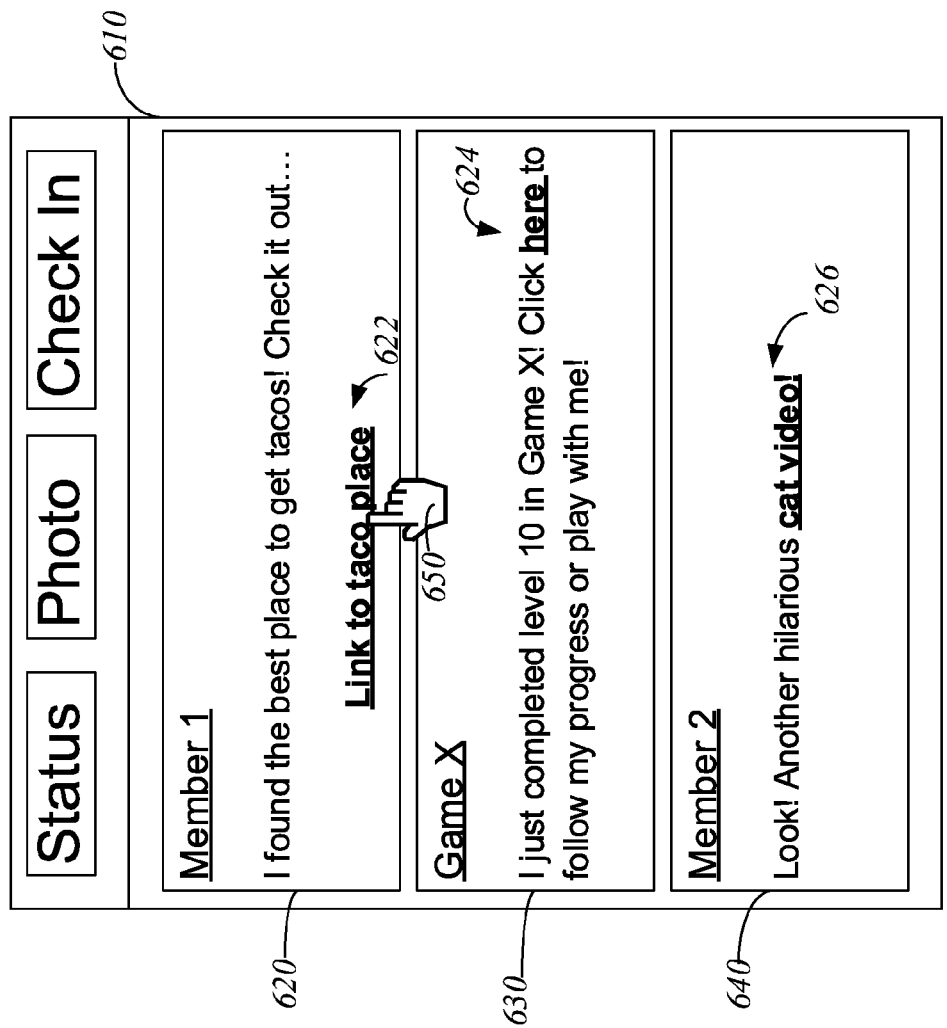
FIG. 6 illustrates an embodiment of a social networking service client user interface.

FIG. 6 illustrates an embodiment of an embodiment of a social networking service (SNS) client user interface (UI) 600. SNS client UI 600 may be presented by SNS application component 150 on client 180. SNS client UI 600 may include a shared content pane 610. Shared content pane 610 may display content shared by other members of SNS 110, including individuals, applications, organizations, businesses, government agencies, and so forth.

Some of the shared content may include third party data links. For example, shard content 620, shared by "Member 1" includes both a personal note "I found the best place to get tacos! Check it out . . . " and a third party data link 622 ("link 622"). In this example, link 622 may, when selected, cause one of several possible actions to occur. If link 622 is to a specific URL for the taco place, then selecting link 622, for example, with a touch control directive 650, may open a browser interface within SNS application component 150 to display the web page referenced by the URL. Alternatively, a separate browser application may be launched to display the web page referenced by the URL.

If link 622 is a reference to, for example, a mapping application or service, selecting link 622 may open a map interface within SNS application component 150 to display a map of the taco place location. Alternatively, a separate mapping application may be launched to display the map of the taco place location.

Shared content 630 may be shared by an application "Game X" and may include a statement about a member's interactions with the application "I just completed level 10 in Game X." A third party data link 632 ("link 632") may also be included. When selected, link 632 may open an interface for Game X within SNS application component 150, or may cause the Game X application to launch separately on the client 180. Game X, either within SNS application component 150, or externally thereto, may need to connect to a game server to retrieve data related to the member's interactions with Game X, such as a game in progress, a level, friends played with, high scores, preferences, and so forth.

Shared content 640 may be shared by a different member "Member 2" and may include a third party data link 642 ("link 642") to a video sharing service. The video sharing service may exist as a web site, as a separate application on client 180, or as both. Selecting link 642 may, accordingly, open the browser interface or launch the separate application.

Regardless of the type of link, links 622, 632, and 642, when followed, may require connecting to a third party data source 140, e.g. to a web site that is not SNS 110, a map server, a game server, or a video sharing site. Selecting links 622, 632, or 642 will route the request for the referenced third party data 142 to client VPN component 160, 260 as described in reference to FIGS. 3-5. The embodiments are not limited to these examples.

Figure 7:
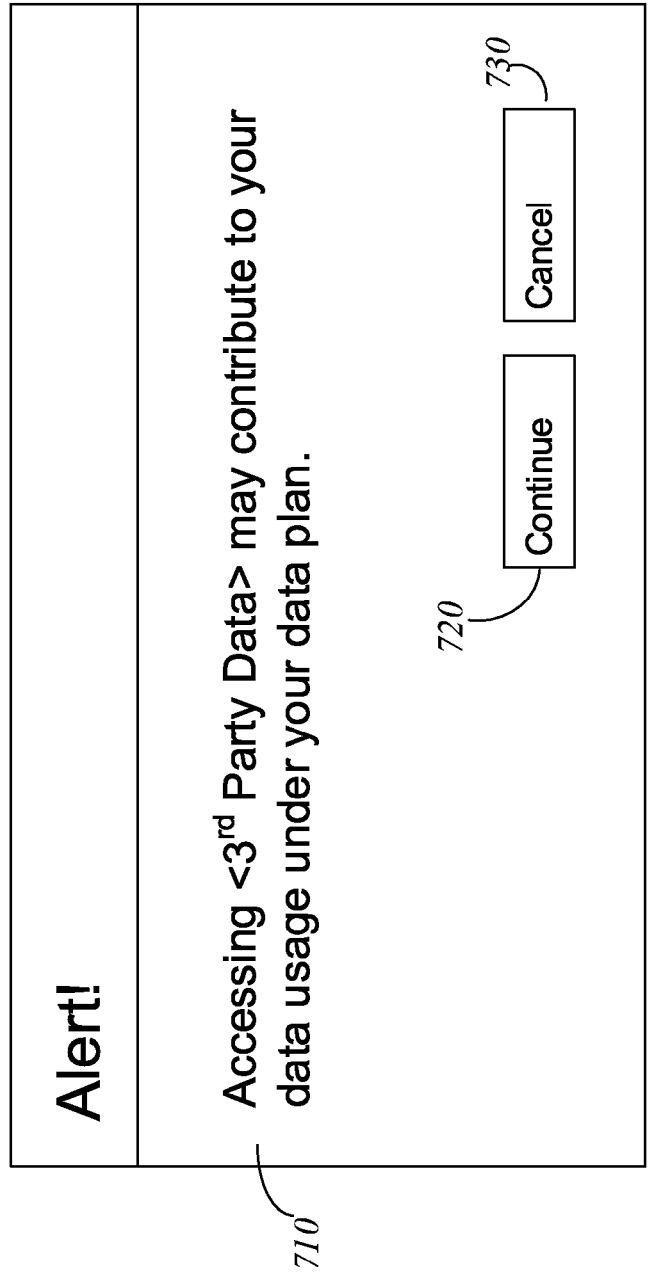
FIG. 7 illustrates an embodiment of an alert user interface.

FIG. 7 illustrates an embodiment of an alert user interface (UI) 700 for the system 100. Alert UI 700 may be displayed, as described in reference to message flow 500, when accessing a third party data link is not to be rate-adjusted. Alert UI 700 informs the member, with a message 710, that following the selected link may contribute to their data plan usage. The portion of message 710 shown as "<$3^{rd}$ Party data>" may in practice be replaced, for example, with the name of the associated third party application or web site.

Alert UI 700 may include selectable options such as continue option 720 and cancel option 730. Selecting continue option 720, for example, with a touch control directive 740, may allow the accessing to proceed, as shown in message flow 500. Selecting the cancel option 730 may cancel the accessing, and may return the member to SNS client UI 600.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
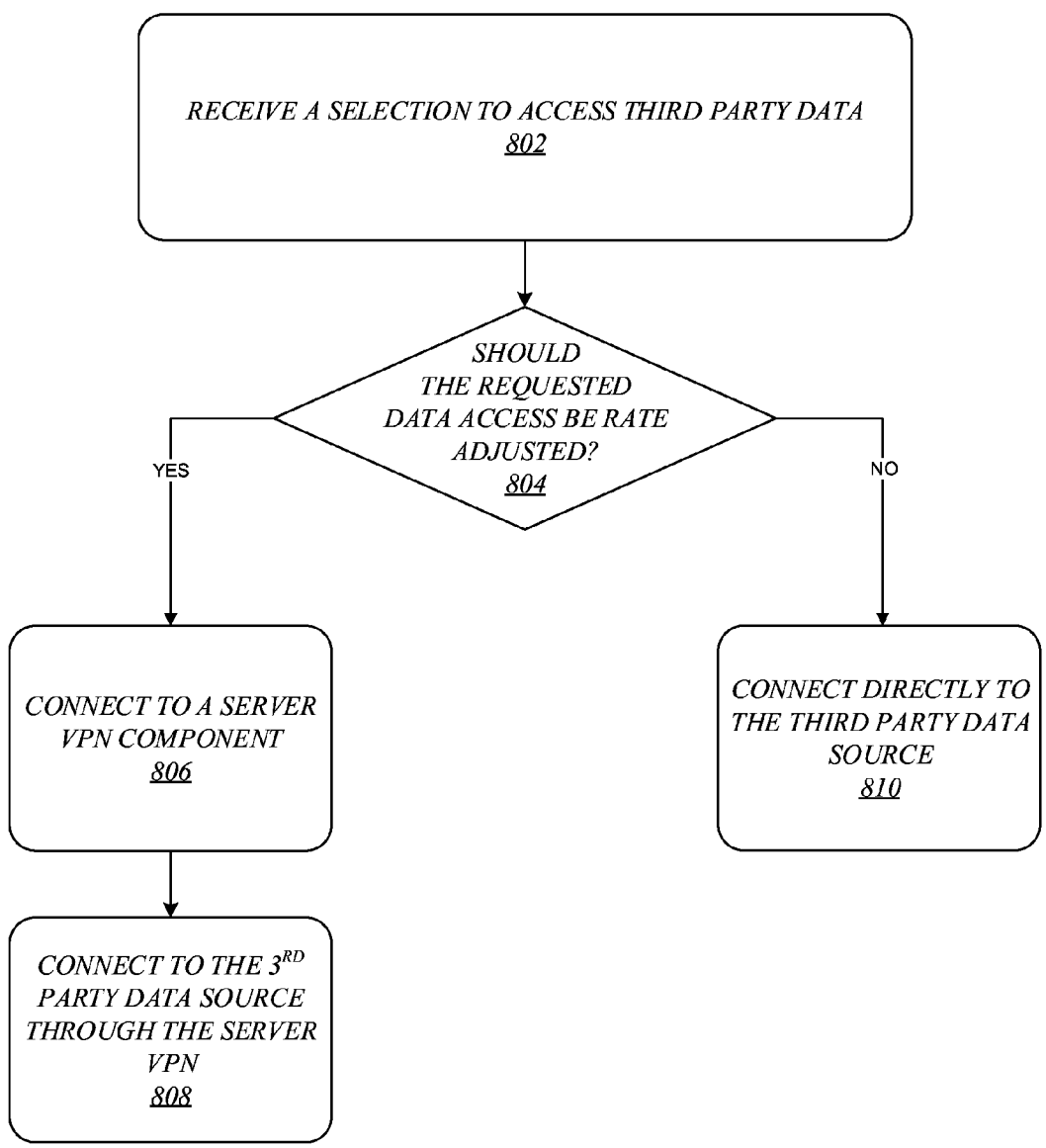
FIG. 8 illustrates an embodiment of a logic flow for the system of FIG. 1.

FIG. 8 illustrates one embodiment of a logic flow 800 for the system of FIG. 1. The logic flow 800 may be representative of some or all of the operations executed by one or more embodiments described herein.

In the illustrated embodiment shown in FIG. 8, logic flow 800 may receive a selection to follow a third party data link in block 802. For example, SNS application component 150 may receive a control directive such as a touch gesture, or an input device selection, to follow third party data link 252.

Logic flow 800 may determine whether accessing the third party data via the link is rate-adjusted at block 804. For example, client VPN component 260 may reference rate-adjustment app data 280 to determine whether either an application component associated with the third party data link, or the third party data source 140 referenced by the third party data link, should be rate-adjusted.

Logic flow 800 may connect to a server VPN when the accessing is rate-adjusted in block 806. For example, client VPN component 160, 260 may initiate or use a VPN connection between client VPN component 160, 260 and server VPN component 130 and may forward the request to access the third party data referenced by the third party data link to server VPN component 130.

Logic flow 800 may access the third party data via the server VPN component in block 808. For example, server VPN component 130 may connect to the third party data source 140 referenced by the followed third party data link. From the point of view of the data plan carrier, such a connection may appear to originate from SNS 110, rather than from a third party application, and may consequently be rate-adjusted.

Logic flow 800 may access the third party data directly at block 810 when the accessing is not rate-adjusted. For example, client VPN component 260 may connect to third party data source 140 directly via network 170 not including the server VPN component 130 in the connection. Optionally, logic flow 800 may first alert the member that accessing the third party data may be counted toward their data plan usage and may provide the option to cancel the accessing.

Figure 9:
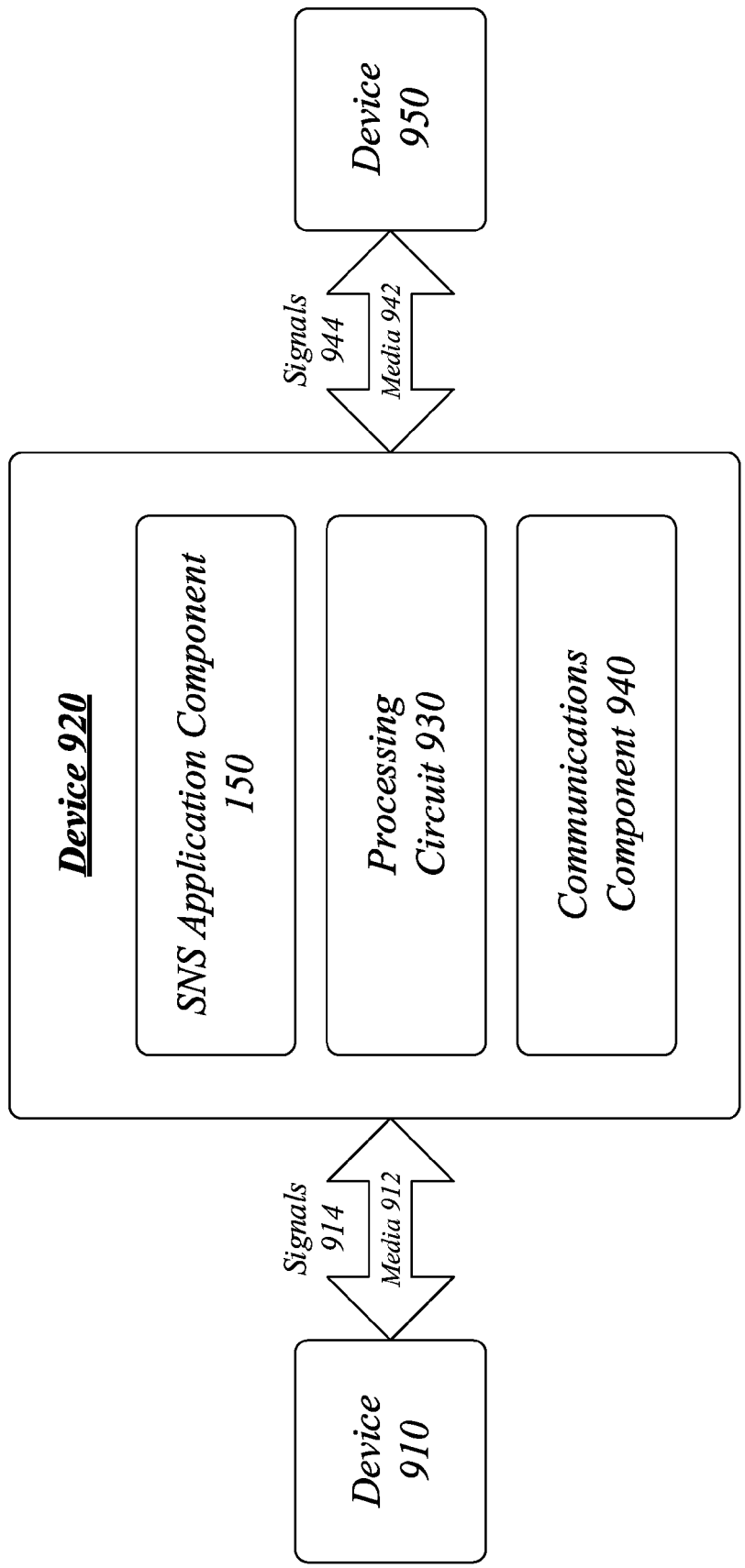
FIG. 9 illustrates an embodiment of a centralized system for the system of FIG. 1.

FIG. 9 illustrates a block diagram of a centralized system 900. The centralized system 900 may implement some or all of the structure and/or operations for the system 100 in a single computing entity, such as entirely within a single device 920.

The device 920 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 920 may execute processing operations or logic for the system 100, in particular for SNS application component 150, using a processing circuit 930. The processing circuit 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 920 may execute communications operations or logic for the system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912, 942 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 920 may communicate with other devices 910, 950 over a communications media 912, 942, respectively, using communications signals 914, 944, respectively, via the communications component 940. The devices 910, 950 may be internal or external to the device 920 as desired for a given implementation. Devices 910, 950, may, for example, implement SNS 110 and/or third party data source 140. The embodiments are not limited to these examples.

Figure 10:
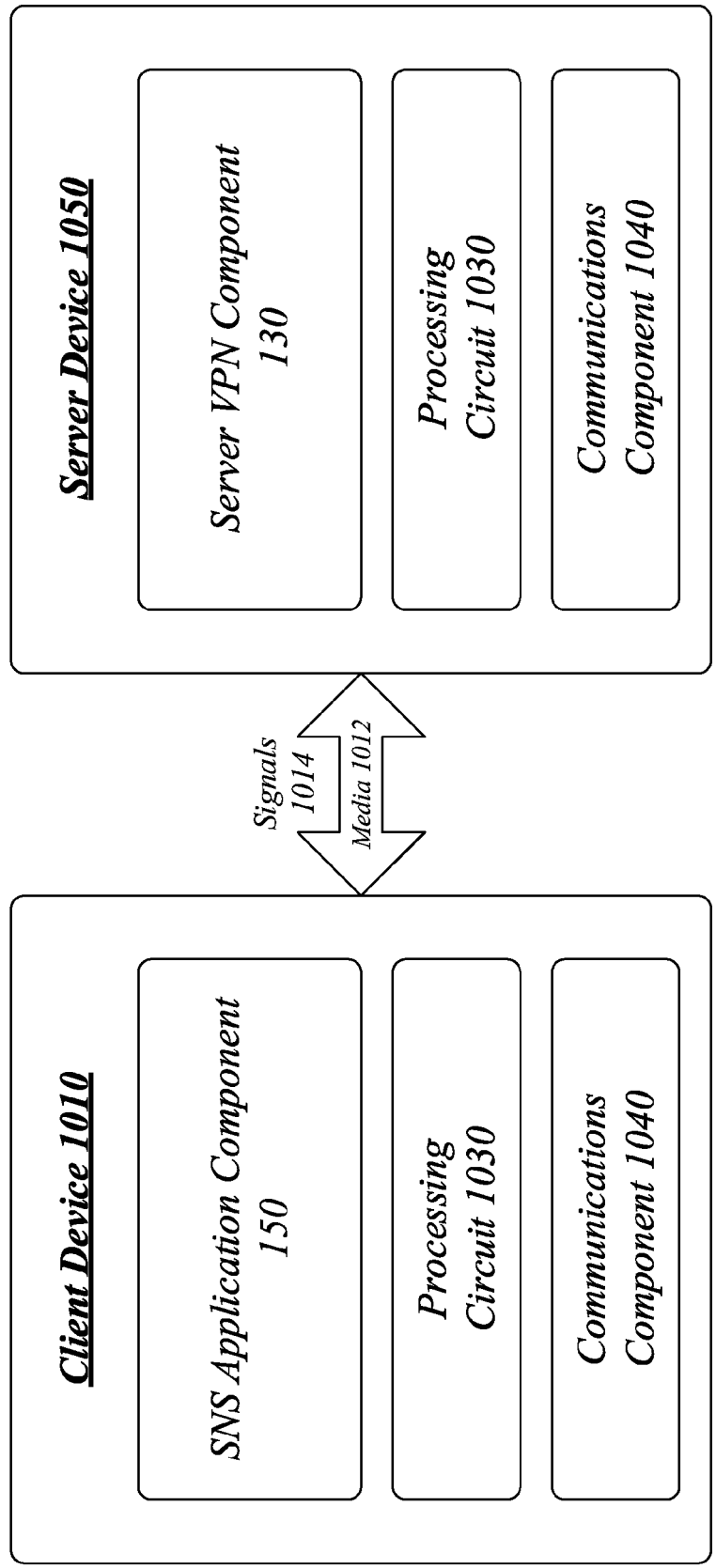
FIG. 10 illustrates an embodiment of a distributed system for the system of FIG. 1.

FIG. 10 illustrates a block diagram of a distributed system 1000. The distributed system 1000 may distribute portions of the structure and/or operations for the system 100 across multiple computing entities. Examples of distributed system 1000 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise a client device 1010 and a server device 1050. In general, the client device 1010 and the server device 1050 may be the same or similar to the client device 920 as described with reference to FIG. 9. For instance, the client system 1010 and the server system 1050 may each comprise a processing circuit 1030 and a communications component 1040 which are the same or similar to the processing circuit 930 and the communications component 940, respectively, as described with reference to FIG. 9. In another example, the devices 1010, 1050 may communicate over a communications media 1012 using communications signals 1014 via the communications components 1040.

The client device 1010 may comprise or employ one or more client programs that operate to perform various methodologies in accordance with the described embodiments. In one embodiment, for example, the client device 1010 may implement, at least SNS application component 150 and client VPN component 160. The client device 1010 may also implement other applications and/or application components that allow client device 1010 to communicate with SNS 110 and present SNS 110 information and content to a member.

The server device 1050 may comprise or employ one or more server programs that operate to perform various methodologies in accordance with the described embodiments. In one embodiment, for example, the server device 1050 may implement some or all of the components of SNS 110. The server device 1050 may in particular implement SNS server component 120 and/or server VPN component 130. Other components of SNS 110 may be implemented by server device 1050 or by other server devices similar to server device 1050 and in communication with server device 1050.

Figure 11:
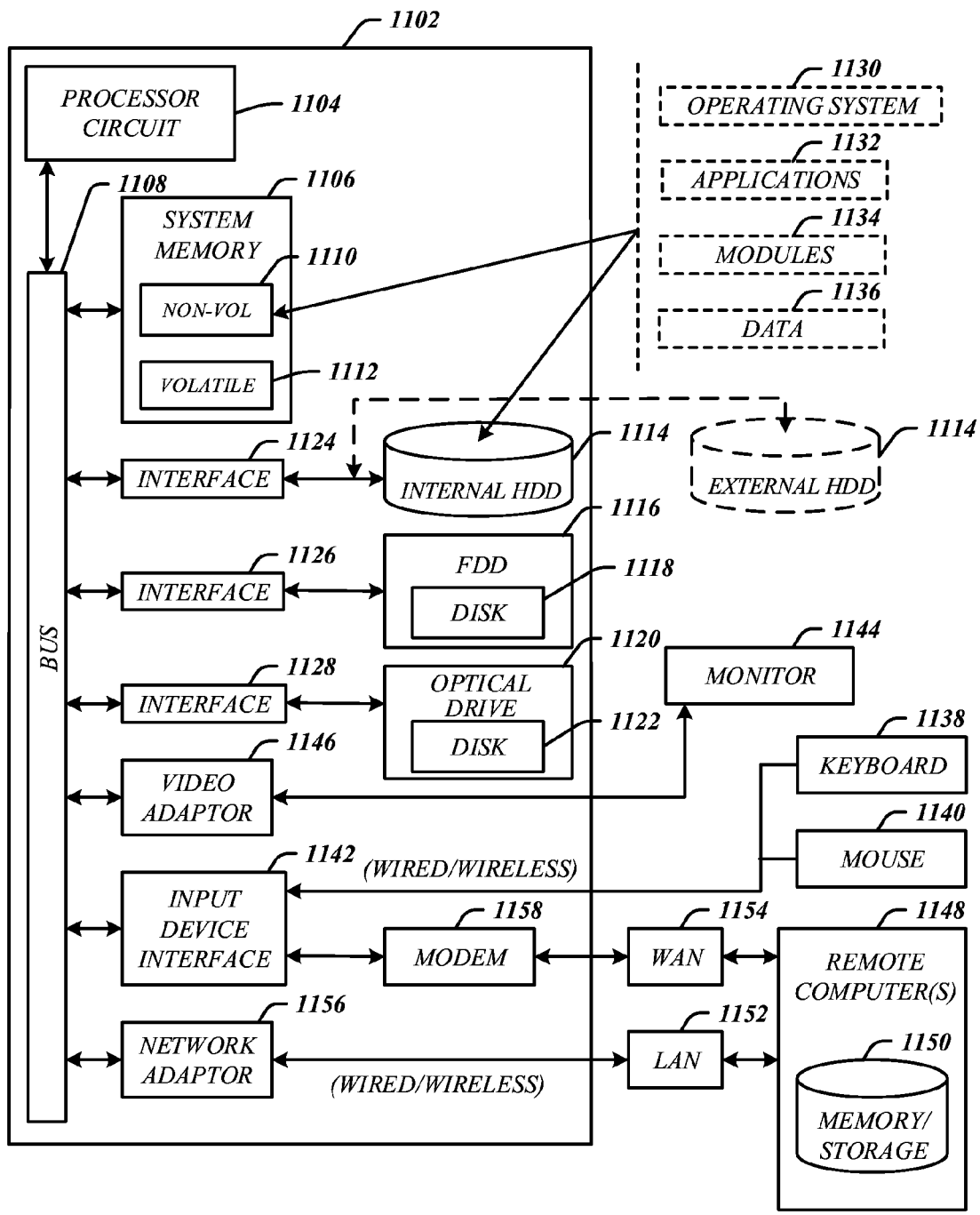
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing circuit 1104, a system memory 1106 and a system bus 1108. The processing circuit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing circuit 1104.

The system bus 1108 provides an interface for system components including, but not limited to, the system memory 1106 to the processing circuit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processing circuit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
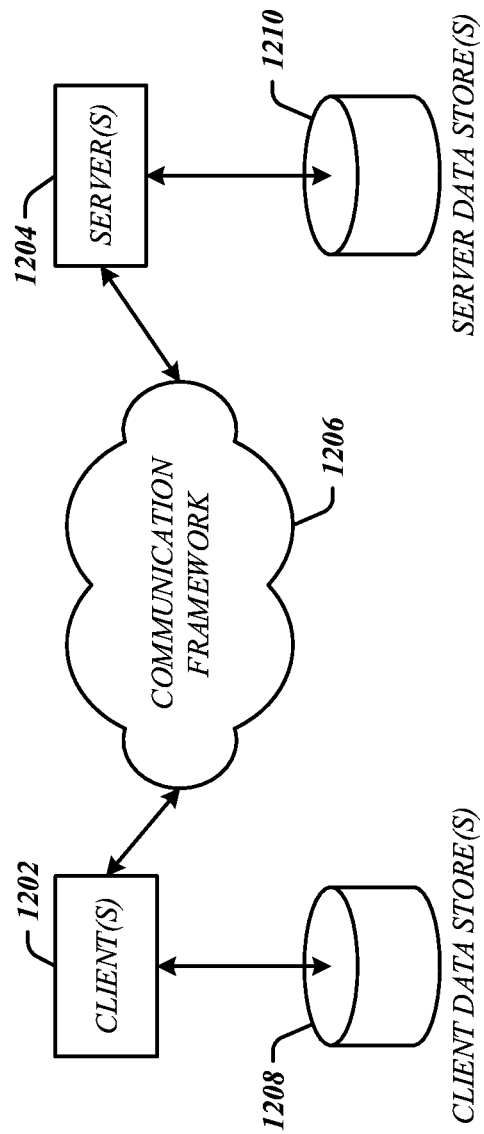
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 1010. The servers 1204 may implement the server device 1050. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

With general reference to notations and nomenclature used herein, the preceding detailed descriptions may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   displaying a link to third party data in an application component executing on a client device;
   receiving a control directive to follow the link;
   executing a third party application on the client device separate from the application component in response to the control directive;
   receiving a request, at a client virtual private network (VPN) component executing on the client device, from the third party application via the application component to access the third party data;
   identifying, by the client VPN component, the third party application that made the request;

determining, by the client VPN component, whether accessing the third party data is rate-adjusted according to the requesting application; and determining, by the client VPN component, whether to connect to a server VPN component over a VPN, the determining based on whether the accessing is rate-adjusted, wherein the third party data is accessed via the VPN when the accessing is rated-adjusted and the third party data is accessed via a network not including the VPN when the accessing is not rate-adjusted.

2. The method of claim 1, comprising:

displaying an alert when the accessing is not rate-adjusted, the alert comprising a first selectable option to continue with the accessing and a second selectable option to cancel the accessing;

receiving a control directive to select the first selectable option; and accessing the third party data via a network not including the VPN.

3. The method of claim 1, comprising:

determining whether accessing the third party data is rate-adjusted according to a rate-adjusted application dataset.

4. An apparatus, comprising:

a processor circuit;

an application component operative on the processor circuit to present a link to third party data, receive a control directive to follow the link, and request access to the third party data;

a third party application, separate from the application component, operative on the processor circuit to launch and execute on the apparatus in response to receiving the control directive to follow the link, and to request access to the third party data via the application component; and a client virtual private network (VPN) component operative on the processor circuit to communicate with a server having a server VPN component, receive the request to access the third party data from the application component, identify the third party application that made the request, determine whether the access is rate-adjusted according to the requesting application, and determine whether to connect to a source of the third party data via the server VPN component, wherein the third party data is accessed via the server VPN component when the accessing is rated adjusted and the third party data is accessed via a network not including the server VPN component when the accessing is not rate-adjusted.

5. The apparatus of claim 4, the client VPN component to form a VPN with the server VPN component when the accessing is rate adjusted.

6. The apparatus of claim 4, the client VPN component to display an alert, when the accessing is not rate-adjusted, the alert comprising a selectable option to continue with the accessing and a selectable option to cancel the accessing; and to connect to the source of the third party data via a network not including the server VPN component when a command directive selecting the selectable option to continue is received.

7. The apparatus of claim 4, wherein the application component is a social networking services application.

8. The apparatus of claim 4, wherein the application component is a second application operating within a social networking application.

9. The apparatus of claim 4, wherein the link to the third party data comprises at least one of: a uniform resource locator (URL) different from a URL of the server and from a URL of the server VPN; a link that, when followed, causes a second application to execute on the apparatus; and a link that, when followed, executes a script on apparatus.

10. The apparatus of claim 4, the client VPN component to determine whether accessing the third party data is rate-adjusted according to a rate-adjusted application dataset.

11. The apparatus of claim 4, the client VPN component to determine and apply at least one of: a level of compression for a data connection between the client VPN and a source of the third party data; a traffic shaping measure for a data connection between the client VPN and a source of the third party data; a filter for a data connection between the client VPN and a source of the third party data; and an anti-virus operation to a data connection between the client VPN and a source of the third party data.

12. At least one non-transitory computer-readable storage medium comprising instructions that, when executed by a processor circuit, cause a system to:

present a link to third party data in an application component executing on a client device;

receive a control directive to follow the link;

execute a third party application on the client device separate from the application component in response to the control directive;

receive a request from the third party application via the application component to access the third party data;

identify the application that made the request;

determine whether the accessing is rate-adjusted according to the requesting application; and determine whether to connect to a server virtual private network (VPN) component over a VPN, the determining based on whether the accessing is rate-adjusted, wherein the third party data is accessed via the VPN when the accessing is rate-adjusted and the third party data is accessed via a network not including the VPN when the accessing is not rate-adjusted.

13. The non-transitory computer-readable storage medium of claim 12, comprising instructions that when executed by the processor circuit cause the system to:

display an alert when the accessing is not rate-adjusted, the alert comprising a first selectable option to continue with the accessing and a second selectable option to cancel the accessing;

receive a control directive to select the first selectable option; and access the third party data via a network not including the VPN.

14. The non-transitory computer-readable storage medium of claim 12, comprising instructions that when executed by the processor circuit cause the system to:

determine whether accessing the third party data is rate-adjusted according to a rate-adjusted application dataset.

15. The non-transitory computer-readable storage medium of claim 12, wherein the application component is one of a social networking services application, and a second application operating within a social networking services application.

16. The non-transitory computer-readable storage medium of claim 12, comprising instructions that when executed by the processor circuit cause the system to:

determine, and apply on the VPN, at least one of:

a level of compression for a data connection between the client device and a source of the third party data;

a traffic shaping measure for a data connection between the client device and a source of the third party data;
a filter for a data connection between the client device and a source of the third party data; and
an anti-virus operation to a data connection between the client device and a source of the third party data.

\* \* \* \* \*